Patented Oct. 12, 1954

2,691,659

UNITED STATES PATENT OFFICE 2,691,659

PROCESS FOR PREPARATION OF
3-IMINOBIS-5-PYRAZOLONES

Bruce Graham and Arnold Weissberger, Rochester, N. Y., assignors to Eastman Kodak Company, Rochester, N. Y., a corporation of New Jersey No Drawing. Application March 14, 1952,
Serial No. 276,673

7 Claims. (Cl. 260—310)

This invention relates to the preparation of 3-iminobis-5-pyrazolones and more particularly to the preparation of 3-alkyliminobis-5-pyrazolones.

There is little literature relating to the preparation of 3-iminobis-5-pyrazolones. British 636,988 discloses that 3-amino-5-pyrazolone can be reacted with a 3-chloro-5-pyrazolone to obtain a 3-iminiobis-pyrazalone, or a hydrazine can be condensed with a malonate imino ether to yield a 3-iminobis-pyrazalone.

We have discovered that if 3-amino-5-pyrazolones are heated with ammonia, primary aliphatic amines, or primary aromatic amines, 3-iminobis-pyrazolones are obtained. Secondary amines do not produce the bis-compounds when reacted with the 3-amino-pyrazolones.

The compounds of our invention have the following general formula:

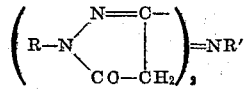

wherein R represents hydrogen, alkyl or aryl groups of the benzene series and R' represents hydrogen, alkyl or aralkyl groups of the benzene series. When R and R' represent alkyl groups, it is preferred that these alkyl groups contain from 1 to 5 carbon atoms.

Typical 3-amino-5-pyrazolones which can be used in our invention to prepare the 3-iminobis-5-pyrazolones are the following:

1-phenyl-3-amino-5-pyrazoline
1-(2,4,6-trichlorophenyl) - 3 - amino-5-pyrazolone
1-p-tert.-butylphenoxyphenyl - 3 - amino-5-pyrazolone
1-phenoxyphenyl-3-amino-5-pyrazolone
1-m-methylphenyl-3-amino-5-pyrazolone
1-(3,5-dimethylphenyl)-3-amino-5-pyrazolone
1-o-chlorophenyl-3-amino-5-pyrazolone
1-methyl-3-amino-5-pyrazolone
3-amino-5-pyrazolone
1-ethyl-3-amino-5-pyrazolone
1-o-sulfophenyl-3-amino-5-pyrazolone
1-o-hydroxyphenyl-3-amino-5-pyrazolone The preparation of these pyrazolones is described in U. S. Patents 2,369,489 and 2,376,380.

Representative primary aliphatic amines which in addition to ammonia may be used for the preparation of the 3-iminobis pyrazolone compounds are as follows:

| | |
|---|---|
| Methylamine | n-Amylamine |
| Ethylamine | Sec. n-amylamine |
| n-Propylamine | Tert.amylamine |
| i-Propylamine | n-Hexylamine |
| n-Butylamine | n-Heptylamine |
| Sec. butylamine | n-Octylamine |
| Tert. butylamine | Benzylamine |

Aromatic amines such as aniline or ring-substituted anilines can also be used to form 3-iminobis pyrazolones.

As mentioned previously, the 3-iminobis pyrazolone compounds of the invention are obtained by heating 3-amino-5-pyrazolones such as those given above in the presence of an excess of ammonia, a primary aliphatic amine, or an aromatic primary amine such as those tabulated above. As will be apparent, during the course of the reaction involving two molecules of the amino pyrazolone, ammonia is liberated. Heat appears to be necessary to consummate the reaction within a reasonable period of time. The formation of the 3-iminobis-pyrazolone compounds has not been observed at temperatures below about 70° C. Accordingly, temperatures of from about 70° to 200° C. are utilized in our invention for preparing the 3-iminobis-pyrazolones. A convenient method is to carry the reaction out under reflux at atmospheric pressure, the temperature of the system being maintained close to the boiling point of the primary aliphatic amine being utilized. When using ammonia and the lower aliphatic amines of low boiling point such as methylamine and ethylamine, a closed system is used to prevent loss of the volatile amine. In case the higher aliphatic amines and aralkyl amines are used such as octylamine, benzylamine, phenylethylamine, etc., the reflux temperature or boiling point of the amine can be used but it is preferred to use lower temperatures of the order of 70° to 100° or 150° C. to prevent undue decomposition. Example 6 following is interesting due to the fact that when n-butylamine was reacted with the particular 3-aminopyrazolone, unexpectedly the formation of only the 3-iminobis-pyrazolone was observed, whereas in the Example 3 utilizing butylamine, the formation of both the 3-iminobis-pyrazolone and the 3-butyliminobis-pyrazolone was observed. Under the above conditions, secondary aliphatic amines do not form bis-compounds with the 3-aminopyrazolones.

*Example 1.—3,3'-iminobis(1-phenyl-5-pyrazolone* I

A. This compound is prepared by heating 10 parts of 1-phenyl-3-amino-5-pyrazolone with 25 parts of liquid ammonia in a sealed tube at 85–90° for 20 hours. Acidification (acetic acid) of the residues from the evaporation of the ammonia affords a 70% yield of the product melting at 290–300°. Analysis, calculated for $C_{18}H_{15}N_8O_2$: C, 64.9; H, 4.5; N, 21.1. Found: C, 64.5; H, 4.4; N, 20.5.

B. 3,3'-iminobis(1-phenyl-5-pyrazolone) can also be prepared, but in lower yields, by treating 1-phenyl-3-amino-5-pyrazolone with boiling aniline. The principal product in this reaction is 1-phenyl-3-anilino-5-pyrazolone; cf. J. Am. Chem. Soc., 64, 2133 (1942). It can be separated from the imino pyrazolone by leaching with ethyl alcohol, since I is insoluble.

*Example 2.—3,3'-ethyliminobis(1-phenyl-5-pyrazolone)* II 1-phenyl-3-amino-5-pyrazolone is heated in a sealed tube at 140° for one hour with 3 parts of ethylamine. The residue remaining, after evaporation and acidification, is a mixture of I, II, and 1-phenyl-3-ethylamino-5-pyrazolone, III. III can be extracted from I and II with hot methanol. II can be extracted from I by using n-butanol. The 1-phenyl-3-ethylamino-5-pyrazolone, III, is produced in yields of less than 10 percent; M. P. 153–5°. Analysis, calculated for $C_{11}H_{13}N_3O$: C, 64.7; H, 6.4; N, 20.6. Found: C, 64.4; H, 6.1; N, 20.7. I and II are produced in approximately equal quantities. II melts at 265–7°. Analysis, calculated for $C_{20}H_{19}N_5O_2$, II: C, 66.3; H, 5.3; N, 19.4. Found: C, 66.0; H, 5.2; N, 19.7.

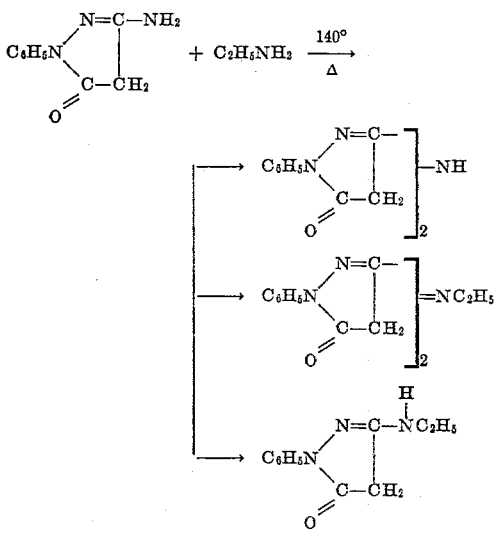

*Example 3.—3,3'-n-butyliminobis(1-phenyl-5-pyrazolone)* IV 1-phenyl-3-amino-5-pyrazolone (175 parts) is heated at reflux for 19 hours in 500 parts of n-butylamine. The amine is removed under vacuum at 100° and the residual oil is taken up in 500 parts of hot methanol and acidified with acetic acid. A precipitate collected from the hot solution was analytically pure I, 61.5 parts, 37%. The cooled solution yielded 30 parts of IV. This was recrystallized from 800 parts of ethyl alcohol to give 17.5 parts IV, M. P. 233–7°. Analysis: Calculated for $C_{22}H_{23}N_5O_2$, IV: C, 67.9; H, 5.9. Found: C, 68.1; H, 5.9.

*Example 4.—3,3'-n-amyliminobis(1-phenyl-5-pyrazolone)* V

A reaction similar to the preceding one was made, using n-amylamine 500 parts and 175 parts of the pyrazolone at reflux. Compound I was produced in 26% yield, while V, after recrystallization from n-butanol, was formed in 15% yield, M. P. 227–230°. Analysis: Calculated for $C_{23}H_{25}N_5O_2$, V: C, 68.5; H, 6.2; N, 17.4. Found: C, 68.1; H, 6.2; N, 17.3.

*Example 5.—3,3'-benzyliminobis(1-phenyl-5-pyrazolone)* VI 1-phenyl-3-amino-5-pyrazolone (20 parts) in 25 parts of benzylamine was heated at 100° for three days. The benzylamine was removed under vacuum. The residue was dissolved in 50 parts of methanol and acidified. The product, VI, amounted to 4 parts. It was recrystallized from n-butanol, M. P. 245–7°. Analysis: Calculated for $C_{25}H_{21}N_5O_2$: C, 70.9; H, 5.0; N, 16.5. Found: C, 70.2; H, 5.2; N, 16.3.

*Example 6.—3,3'-iminobis(1-p-tert.-butyl-phenoxyphenyl-5-pyrazolone)* VII 1-p-tert.-butylphenoxyphenol-3-amino-5-pyrazolone (32 parts) was heated at reflux in 100 parts of n-butylamine for 18 hours. The amine was removed under vacuum and the residue was dissolved in 100 parts of methanol. The acidified solution yielded 8 parts of VII. This was recrystallized from n-butanol, M. P. 260–5°. Analysis: Calculated for $C_{38}H_{39}N_5O_4$: C, 72.5; H, 6.3; N, 11.1. Found: C, 72.1; H, 6.0; N, 11.1.

*Example 7.—3,3'-iminobis(1-methyl-5-pyrazolone)* VIII

Ten parts of 1-methyl-3-amino-5-pyrazolone were suspended in 30 parts of aniline and the mixture was refluxed 1.5 hours (180–190°). The cooled solution yielded a precipitate which was collected and washed with methanol. The resulting solid (4 parts) was triturated with 200 parts of boiling acetonitrile and filtered hot. A solid remained on the filter, 1 part, m. above 310°. This material couples with color developers to yield the typical bathochromically shifted magenta dyes characteristic of the 3-iminobis-5-pyrazolones.

The cooled acetonitrile wash yielded 2 parts of solid, m. 221–3°, which is 1-methyl-3-anilino-5-pyrazolone. Analysis: Calculated for $C_{10}H_{11}N_3O$: C, 63.5; H, 5.8; N, 22.2. Found: C, 63.9; H, 5.5; N, 22.1.

In the manner of the above examples, ammonia and the other primary aliphatic or aromatic amines are reacted with the mentioned 3-amino pyrazolones to obtain either 3-iminobis pyrazolones, or 3-alkyliminobis pyrazolones.

The compounds of the invention are of particular use in silver halide emulsions for color photography. The compounds are dispersed in silver halide emulsions by well-known methods and after exposure of the emulsion layers to a suitable subject, the emulsion layer is developed with a developing solution containing a primary aromatic amino silver halide developing agent, the resulting oxidation products of which combine with the coupler compound to form a dye image in situ with the developed silver halide. In addition, the compounds can be used in photographic color developing solutions, containing primary aromatic amino silver halide developing agents, which are used for the development of dye images in multilayer color films. It is particularly desirable to further react the 3-iminobis pyrazolones of the invention in order to render them less diffusible in photographic emulsion layers. For example, 3-iminobis(1-phenyl-5-pyrazolone) prepared as in Example 1 can be acylated with acid halides of suitable molecular weight to decrease diffusibility in emulsion layers. This pyrazolone, when acylated in pyridine solution with 3-(4'-tert.-amylphenoxy)-benzoyl chloride yields the compound 3,3'-[p-(p-tert-butyl-phenoxy)benzoylimino]-bis-(1-phenyl-5-pyrazolone) having a melting point of 230–232° C. Other acid halides can be reacted similarly with the 3-iminobis pyrazolones of the invention at the 3-imino group to increase the molecular weight and decrease the diffusibility of the couplers in emulsion layers.

In case the groups represented by R and R' in the above formulas contain free acid groups such as carboxyl and sulfonic acid, the coupler compounds can be incorporated directly into a gelatino-silver halide emulsion layer as described in Fischer U. S. Patent 1,055,155, otherwise methods such as described in Mannes et al. U. S. Patent 2,304,940 or Jelley et al. U. S. Patent 2,322,027 may be used, e. g. as in Example 1 of the latter patent. The emulsion is then exposed and developed as described above in a conventional developer solution such as one containing sulfite, carbonate and bromide in addition to the color-developing agent.

What we claim is:

1. A method for preparing a 3,3'-iminobis-(1-aryl-5-pyrazolone) which comprises heating a 1-aryl-3-amino-5-pyrazolone in the presence of a saturated primary aliphatic amine the alkyl group of which consists only of carbon and hydrogen atoms, at a temperature of from about 70 to 200° C.

2. A method for preparing an iminobis-pyrazolone having the general formula

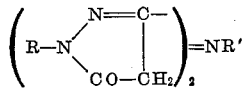

wherein R represents a mononuclear aryl group of the benzene series and R' represents an alkyl group of from 1 to 5 carbon atoms, which comprises heating a 1-aryl-3-amino-5-pyrazolone in the presence of a saturated primary aliphatic amine the alkyl group of which consists only of carbon and hydrogen atoms, at a temperature of from about 70 to 200° C.

3. A method for preparing an iminobis-pyrazolone having the general formula

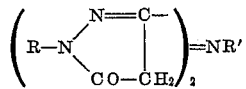

where R represents a phenyl group and R' represents an alkyl group of from 1 to 5 carbon atoms, which comprises heating 1-phenyl-3-amino-5-pyrazolone in the presence of a saturated primary aliphatic amine the alkyl group of which consists only of carbon and hydrogen atoms, at a temperature of from about 70 to 200° C.

4. A method for preparing 3,3'-ethyliminobis-(1-phenyl-5-pyrazolone) which comprises heating 1-phenyl-3-amino-5-pyrazolone in the presence of ethylamine at a temperature of from about 70 to 200° C.

5. A method for preparing 3,3'-n-butyliminobis-(1-phenyl-5-pyrazolone) which comprises heating 1-phenyl-3-amino-5-pyrazolone in the presence of n-butylamine at a temperature of from about 70 to 200° C.

6. A method for preparing 3,3'-n-amyliminobis-(1-phenyl-5-pyrazolone) which comprises heating 1-phenyl-3-amino-5-pyrazolone in the presence of n-amylamine at a temperature of from about 70 to 200° C.

7. A method for preparing an iminobis-pyrazolone having the general formula

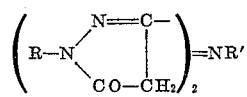

wherein R represents a member of the class consisting of a hydrogen atom, an alkyl group of from 1 to 5 carbon atoms and a monocyclic aryl group of the benzene series, and R' represents a member of the class consisting of an alkyl group of from 1 to 5 carbon atoms and a monocyclic aralkyl group of the benzene series, which comprises heating a 3-amino-5-pyrazolone in the presence of a member of the class consisting of a saturated primary aliphatic amine the alkyl group of which consists only of carbon and hydrogen atom, and a saturated monocyclic primary aralkyl amine at a temperature of from about 70–200° C.

References Cited in the file of this patent

UNITED STATES PATENTS

| Number | Name | Date |
|---|---|---|
| 2,343,703 | Porter et al. | Mar. 7, 1944 |
| 2,376,380 | Porter et al. | May 22, 1945 |
| 2,411,951 | Bavley | Dec. 3, 1946 |

FOREIGN PATENTS

| Number | Country | Date |
|---|---|---|
| 639,988 | Great Britain | May 10, 1950 |

OTHER REFERENCES

Weissberger, J. A. C. S., vol. 64, pp. 2133–2136.